United States Patent
Todasco et al.

(10) Patent No.: US 10,679,208 B2
(45) Date of Patent: Jun. 9, 2020

(54) LOCAL DIGITAL TOKEN TRANSFER DURING LIMITED OR NO DEVICE COMMUNICATION

(71) Applicant: PAYPAL, INC., San Jose, CA (US)

(72) Inventors: Michael Charles Todasco, San Jose, CA (US); Cheng Tian, San Jose, CA (US)

(73) Assignee: PAYPAL, INC., San Jose, CA (US)

(*) Notice: Subject to any disclaimer, the term of this patent is extended or adjusted under 35 U.S.C. 154(b) by 96 days.

(21) Appl. No.: 15/818,362

(22) Filed: Nov. 20, 2017

(65) Prior Publication Data

US 2019/0156326 A1    May 23, 2019

(51) Int. Cl.
| | |
|---|---|
| *G06Q 20/32* | (2012.01) |
| *H04W 4/80* | (2018.01) |
| *G06Q 20/38* | (2012.01) |
| *H04W 8/00* | (2009.01) |

(52) U.S. Cl.
CPC ..... *G06Q 20/3278* (2013.01); *G06Q 20/3821* (2013.01); *H04W 4/80* (2018.02); *G06Q 20/3224* (2013.01); *H04W 8/005* (2013.01)

(58) Field of Classification Search
CPC ............. G06Q 20/3278; G06Q 20/352; G06Q 20/3224; H04W 4/80; H04W 8/005
See application file for complete search history.

(56) References Cited

U.S. PATENT DOCUMENTS

| | | | |
|---|---|---|---|
| 9,972,004 B1* | 5/2018 | Donavalli | G06Q 20/3224 |
| 2004/0024867 A1* | 2/2004 | Kjellberg | H04L 29/06 709/224 |
| 2012/0239556 A1* | 9/2012 | Magruder | G06Q 20/381 705/39 |
| 2017/0193468 A1* | 7/2017 | Chougule | G06Q 20/102 |
| 2017/0316418 A1* | 11/2017 | Sarin | G06Q 20/40145 |
| 2018/0137498 A1* | 5/2018 | Kim | G06Q 20/204 |
| 2019/0095901 A1* | 3/2019 | Gosalia | G06Q 20/401 |

OTHER PUBLICATIONS

Alaa Eddin Al-Chalabi, "A wearable and ubiquitous NFC wallet," May 3-6, 2015, IEEE (Year: 2015).*

* cited by examiner

*Primary Examiner* — Edward Chang
*Assistant Examiner* — William D Newlon
(74) *Attorney, Agent, or Firm* — Haynes and Boone, LLP

(57) ABSTRACT

There are provided systems and methods for local digital token transfer during device communication limitations. A first computing device of a first user may include applications and data necessary to generate and/or transmit a data token to a second device to provide particular data to the second device, including a token used for electronic transaction processing. The first device may be unable to communicate with the second device in particular instances, for example, if the first device becomes non-operational due to battery power, location specific requirements, or other operation issue. Thus, the first device may store the token locally or to a nearby associated device, such as a keyfob device or other transceiver. The token may then be available to a third device when the first device is limited from communications, which may be used to communicate the token to the second device.

20 Claims, 5 Drawing Sheets

LOCAL DIGITAL TOKEN TRANSFER DURING LIMITED OR NO DEVICE COMMUNICATION

TECHNICAL FIELD

The present application generally relates to transfer of digital tokens between devices during limited or no device communications, which can be used to transfer a digital wallet token to a first device for electronic transfer processing when a communication channel between that first device and a second device cannot be formed. In some instances, a third device may be utilized to cause transfer of the digital token to the first device.

BACKGROUND

Tokenization and data token exchange may be used to securely transmit data between endpoints, for example, two or more devices, where the data may be secured by substituting sensitive or private data for non-sensitive or randomly generated data, or a "token." Electronic transaction processing may be effectuated using these data tokens, for example, by providing data necessary to perform the transaction processing from one device to another device. A digital wallet of a user may include processes and data necessary for electronic transaction processing, where the digital wallet and/or sensitive data in the digital wallet may be represented by one or more tokens that may be exchanged with the processing device to increase security during electronic transaction processing and provide other benefits to a user of the computing device. However, token exchange and electronic transaction processing between two devices requires compliant and shared communication protocols between the devices, as well as device functionality, such as battery power, a communication link, active wireless transceivers, and/or application/process execution. If one or more of the devices cannot meet these prerequisite processing conditions, then transaction processing may be difficult if not impossible. Thus, users may face disadvantages in token exchange and/or data processing when devices are incompatible or a device has communication limitations.

Figure 1:
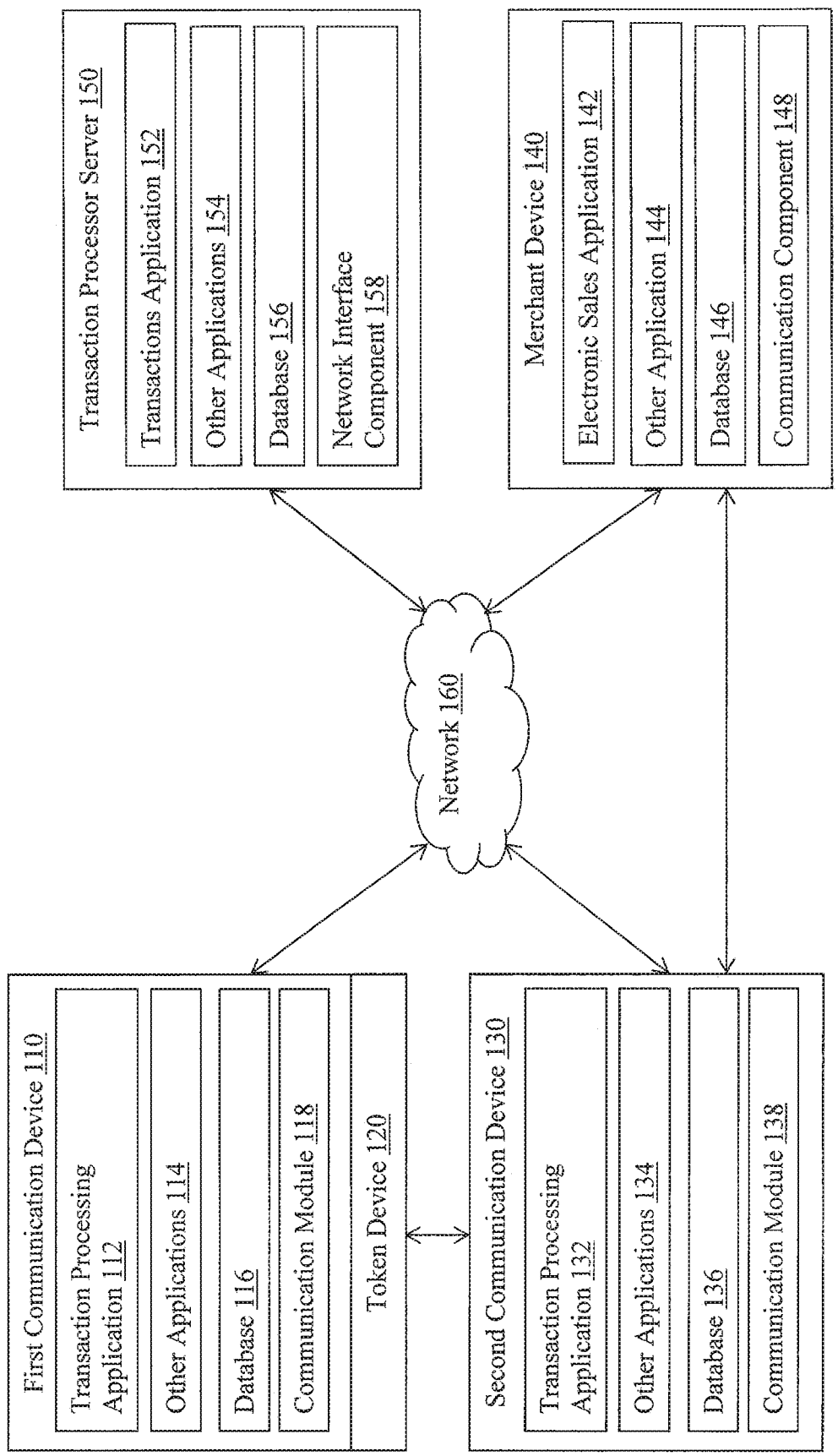
FIG. 1 is a block diagram of a networked system suitable for implementing the processes described herein, according to an embodiment.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Provided are methods utilized for local digital token transfer during device communication limitations, such as limited or no communication between devices of two parties conducting a transaction, by using a third device to facilitate the transaction on behalf of one of the parties using a token transferred to the third device by the one of the parties. Systems suitable for practicing methods of the present disclosure are also provided.

Users may engage in real-world interactions with other users in various embodiments, where the real-world interaction may require an associated payment or transfer. For example, a user may visit a real-world location where the user wishes to purchase an item in a transaction, which may require a payment. Other types of real-world interactions that may require payment may be between two individual users. For example, friends and/or family may eat together or go shopping, where one member of the group pays for a transaction and desires reimbursement from one or more other members of the group. Similarly, other users may physically interact and wish to transfer money to another user, for example, in the case of a sale of goods between two users or where users may wish to provide a gift, repayment, or other fund transfer to the other user. These users may utilize mobile computing devices, such as smart phones, to access one or more transaction processing applications to process transactions between users and/or merchants, such as payments and/or transfers. Such transactions may be completed through communications between devices, including transfer of digital tokens storing data that may be used and/or redeemed for process-able data with a tokenization system. However, such applications and devices require the use of computing devices and their associated communication components. For example, various types of output components, antennas, and/or transceivers may be required to exchange data between devices, which all require device power and compatible operational conditions and protocols. Thus, previous solutions to electronic transaction processing may only be valid for the availability of compatible communication device technologies and for operational communication devices. Thus, these solutions suffer from problems in compatibility and device operational issues, and fail to provide users with a full functional solution.

According to various embodiments, a first user may wish to utilize a first communication device (e.g., a mobile smart phone or other mobile computing device) while performing real-world actions or interactions, for example, when paying for a meal or shopping for items at a physical merchant location. However, the first communication device may have particular communication limitations at the merchant location. For example, the first device may be limited in communication protocols usable by the first device, including types and protocols for short range wireless communications and signals. These types and protocols for wireless transmissions at the merchant location may be incompatible with merchant devices at the merchant location, such that the first device is unable to communicate with a merchant device for electronic transaction processing and/or token exchange. The first device may also have incompatible software or applications for use with merchant devices at the merchant locations, use different protocols, encryption, and/or authentication for data exchange, and/or not have available data storage for installation of such software (or the first user may not wish to install on the first device). The first device may also suffer from performance issues, including loss of particular wireless communication functionalities, processing requirements, and/or battery power. Thus, the first device may be unable to communicate with or have limitations on communication with one or more merchant devices at the merchant location in order to resolve electronic transaction processing and/or token exchange for such processing. In such embodiments, the data exchange may be for a sale of goods between the first user and the merchant at the merchant location. However, other data exchanges at particular locations may also similarly require device compatibility and wireless data exchange and utilize the processes described herein, including for user identification and/or authentication, location detection, messaging, or other data exchange between two or more devices where one device suffers from communication limitations with another one of the devices.

Similarly, a second user may also utilize a second communication device at the merchant location. Both the first and second communication devices may correspond to mobile computing devices, including smart phones, wearable devices, and/or tablet computers. Thus, the first and second users may be in possession of their respective devices at the merchant location, such as on their person or nearby at the merchant location. Unlike the first device, the second device may be able to communicate with one or more merchant devices at the physical merchant location, for example, through appropriate wireless signaling and communication protocols. The second device may therefore have appropriate hardware, software, power, and/or other device functionality to communicate data to the merchant device, including a digital token or other data used for electronic transaction processing. Thus, the second device may be used to perform electronic transaction processing by the second user with the merchant device, for example, to pay for a transaction electronically between the second user and the merchant at the merchant location using one or more applications and/or data transfers of the second device and/or the merchant device. The second device may not necessarily be utilized to process the transaction between the second user and the merchant; however, the second device may have the required communication processes, hardware, and/or other requisite capabilities to communicate data to the merchant device.

The second device may also be utilized by the first user for electronic transaction processing using a data token for the first user, first device, and/or digital wallet/payment instrument of the first user, as discussed herein. In order to utilize the second device, the first device may directly communicate with the second device to provide a first data token to the second device, or may utilize an intermediary device, such as a token device, which may communicate the token to the second device. Where the first device and the second device communicate directly, the first device may have a compatible communication channel with the second device, such as a shared protocol, encryption keys, transceivers, etc., between the first device and the second device.

The first device may also have sufficient processing capabilities to communicate with the second device, including sufficient data storage and power, compatible applications, and/or other requirements for data exchange. In such embodiments, the first device may still require the second device to transmit the data token to the merchant device, for example, if the first device cannot communicate with the merchant device. However, the first device may not have appropriate capabilities and functionality to communicate with the merchant device. The first device may also generate and locally store the data token, which may be instead retrieved by the second device instead of actively communicated to the second device, including storage in a powerless and/or low power storage and/or transceiver, such as a local RFID chip or tag of the first device, which may be read by the second device.

However, in other embodiments, the first device may also be unable to communicate with the second device. Thus, the aforementioned intermediary device, such as a token device, may be issued/used by the first user to store, make available, and/or communicate/allow retrieval of a data token stored to the device. The token device may correspond to a physical device having at least a memory and an antenna that may allow for storage of data, activation of stored data, and/or retrieval of data by another device, such as the second device. The token device may also include additional features, hardware, and/or software as necessary, and may utilize one or more short range wireless communication protocols or standards to communicate with other devices, including the first device and the second device, through near field communications (NFC), Bluetooth, Bluetooth Low Energy (BLE), LTE Direct, and/or other radio frequency transmissions. The intermediary token device may be utilized when communication limitations prevent or limit data transfer between the first device and the second device such that transfer of the data token from the first device to the second device is not possible. For example, the first device may not have power sufficient to transfer the token, or may utilize different short range wireless communication protocols for transfer of data. The intermediary token device may correspond to an RFID tag, a keyfob device, a Bluetooth or Bluetooth Low Energy beacon device, or an NFC device.

The first device may receive a request by the first user of the first device to generate and provide the data token to the second device, for example, if the first user makes a decision that the first device may lack communication capabilities with merchant device(s) at the merchant location. The first device may also determine whether transmission of a data token to a second device is required, for example, based on the communication limitations of the first device at the merchant location (e.g., without a user request or input). The first device may utilize device data, including available power level, communication protocols and channels, applications, available processing power/speed, available memory, and/or other device specific data for the first device. The data may also correspond to past user requests in similar operating conditions and/or at the same or similar merchant location. Using the data, the first device may determine whether the first device is required to transmit a data token to the second device, including storage of the data token on a token device. Thus, the first device may make predictive decisions on whether the first device will be partially or fully non-operational at a future time based on operating data and conditions of the first device, including lack of or limitations to power and/or one or more communication functionalities at the merchant location. In such instances, the first device may then generate and/or transmit the data token or other data required at the merchant location to the second device, or may store the data token or other data locally and/or to the token device for retrieval by the second device.

The first device may also receive information of available communication protocols and/or other location specific data for the merchant location of the first device and the merchant device, which may be used to determine whether the first device is required to make the token available to the second device (e.g., through transmission or local storage/storage to the token device). The data of the communication protocols and/or communication procedures available at the merchant location may be previously stored to the device, for example, based on past connections at the merchant location and/or data retrieved of available communication protocols, channels, and/or merchant device parameters/specifications. A service provider associated with the first device and/or merchant location may also provide the data of available communication information for the merchant location. Using the data, as well as the device configuration and/or specifications of the first device, the first device may determine whether the first device can communicate with the merchant device. If the first device cannot communicate with the merchant device, then the first device may make the token (or other data) available to the second device for transmission to the merchant.

In other embodiments, a server for a service provider, including a cloud computing server architecture, may request that the first device transmit the token to the second device, or generate and/or store the data token for the second device to the first device or the token device. The service provider may detect a location of the first device through a GPS locator and/or service, or other location detection process, for example, when the first device opens an application to perform electronic transaction processing at the merchant location. The service provider may utilize the aforementioned device configuration and capabilities data for the first device, as well as the merchant location specific data for communications available at the merchant location, to determine whether the first device is required to make available the token or other data to the second device. The service provider may predict whether the first device is required to make available the token based on past locations and data processing/communication requirements by the first device and/or other devices at the merchant location. The service provider may utilize such data with detected operation conditions and/or available wireless communication signaling at the merchant location to transmit a data process request to the first device to transmit the token to the second device or store the data token locally or to the token device for retrieval by the second device.

The merchant device at the merchant location may also transmit a request through the service provider server (e.g., through a wired or wireless connection to a network, such as the Internet) that one or more communication devices using a particular (or more than one) communication protocols for short range wireless communications at the merchant location utilize another device for transmission of data to the merchant device. For example, the merchant device may only have certain available communication protocols, devices, or channels at the merchant location, and may notify the server that devices using other communications aside from those available at the merchant location will be unable to communicate with the merchant device. In this regard, the service provider may then detect devices at the merchant location, for example, through GPS locators and/or services, or other location detection process (e.g., a check-in, WiFi connection, etc.), and may determine whether the service provider is required to request that the first device provide the token or other data to the second device.

Generating a token and/or storing the token to a device, including the first device and/or the token device for transmission to the second device, may utilize an online service provider, such as a transaction processing service and/or the aforementioned service provider that determines available communications available at the merchant location. The transaction processing service may allow two or more entities (e.g., personal users, groups of users, merchants, etc.) to engage in electronic processing for a transaction (e.g., a payment or transfer between the first user and the second user). The service provider may further provide additional types of services, including account services and digital wallet service, for example, to store one or more financial instruments of the appropriate user for use in transaction processing and provide a digital wallet that may be utilized to perform transaction processing through tokenized payment services.

In this regard, the first and/or second user, as well as the merchant, may further be required to establish an account with the service provider in order to engage in transaction processing. The appropriate user/merchant may be required to provide personal, business, or other identification information to establish the account, such as a name, address, and/or other information. The user/merchant may also be required to provide financial information, including payment cards (e.g., credit/debit cards), bank account information, gift cards, and/or benefits/incentives, which may be utilized to provide payments or otherwise engage in processing of another transaction. In order to create an account, the user/merchant may be required to select an account name and/or provide authentication credentials, such as a password, personal identification number (PIN), security questions, and/or other authentication information. The service provider may utilize such information to create the account for the user/merchant, and provide the user/merchant with a digital wallet that allows for electronic transaction processing. The digital wallet may store the user's/merchant's financial instruments and allow the user/merchant to process transactions through the digital wallet. In this regard, the service provider may provide a digital token to a device (e.g., the first or second communication device), such as a data packet, that represents the digital wallet and may approve the appropriate user for use of digital wallet for processing of a transaction with the service provider/transaction processor. Thus, the token may include data identifying the digital wallet (e.g., a token), as well as authentication information including an identifier for use of the digital wallet, which may be encrypted. The token may be utilized by a tokenization system of the service provider/transaction processor to determine valid transaction processing data for the digital wallet, and process a transaction. The token may correspond to a non-sensitive data element that also allows identification of appropriate information for processing the transaction, which may be presented by the first or second user during transaction processing to process the transaction (e.g., provide the payment/transfer, or request the payment/transfer to the associated account/digital wallet).

Once an account is created, the account may be accessed through a web browser from a website of the service provider and/or a dedicated application of the service provider, such as a mobile smart phone application. The first and/or second users may engage in transaction processing through accessing their respective account and/or providing the data token for transaction processing. Thus, the aforementioned token may be issued to the respective user for their respective accounts, where the token may include data (which may be encrypted) allowing the service provider to identify the user and their account, as well as authenticate the user. As such, the token may be transmitted to other entities during transaction processing (e.g., from the first device and/or token device to the second device), which may allow the service provider to identify and authenticate the user's account and engage in transaction processing. Thus, the accounts may store information associated with each user for use in transaction processing.

In this regard, a computing device for a user (e.g., the first or second user), such as the first or second communication device, may further include a mobile payment application or more generally a transaction processing application, which may be configured to send and receive payments to another party, as described herein. In various embodiments, a website may provide the transaction processing services, and thus may be accessed by a web browser application. The application (or website) may be associated with a payment provider, such as PayPal® or other online payment provider services, which may provide payments and the other aforementioned transaction processing services on behalf of the users. The application may execute on the computing device for the first and/or second user, and may provide various functionalities and processes to the user. As discussed above, the first user may generate or retrieve the token, which may be made available to the second device based on one or more determinations and/or requests discussed herein.

Once the first communication device determines that the data token is required to be transmitted to the second communication device, or stored locally/to the token device for retrieval by the second device, the first device may access the token and perform the required process at the merchant location. Where the first device pushes the token to the second device, the second device may not be required to perform any process aside from receiving and storing the token. In this regard, the first device may receive an identifier used to detect and communicate with the second device over a first wireless communication channel, which may utilize a different protocol than those accepted by the merchant device. The first device may also scan for available nearby devices using wireless signals of the first device at the merchant location, and connect with the second device for transmission of the data token. However, where the first device becomes non-operational, or otherwise does not actively transmit the token, and stores the token to the first device or the token device for retrieval by the second device, the second device may actively request a connection and connect with the first device/token device storing the token, and may retrieve the token for storage and use by the second device. In such embodiments, the second device may instead receive an identifier of the first device/token device to connect with the appropriate device. The second device may also scan using wireless signals over one or more communication protocols for the second device/token device storing the token, which may be detected and then provided to the second device by the first device/token device. In this regard, the token may be stored to the first device/token device with an identifier or other data that indicates that the second device should retrieve the token and provide the token to the merchant device over a second wireless communication channel with the merchant device, which may utilize a different protocol than the first wireless communication channel. The data stored with the token or other transaction processing data on the first device/token device may therefore be detected through wireless signaling of the second device and instruct the second device to retrieve, store, and then transmit the token to another device for transaction processing.

A plurality of other users at the merchant location may similarly have devices in use at the merchant location. The second device may scan or query each device for a token and/or token instructions for transmission to the merchant device, as discussed herein. Such scanning may occur using first short range wireless signals having a first communication protocol that is different from a second communication protocol for second short range wireless signals exchanged between the second device and the merchant device. The second device may scan in response to one or more of the aforementioned conditions, and the second device may search other devices for available tokens that are required to be transmitted to the merchant device. When scanning the other devices and identifying a stored token made available to the second device, for example, with instruction data to transmit the token to the merchant device, the second device may then access and retrieve the token from the stored memory. The second device may then store the token to local memory and/or prepare the token for transmission to the merchant device.

The second device may then transmit the token to the merchant device, for example, using a second wireless communication channel having a different and/or unavailable communication protocol than what was used for transmission of the token by the first device to the second device or token device. For example, short range wireless communications, such as Bluetooth or WiFi, may be utilized to transmit the token to the merchant device when the second device is interacting with the merchant device. The second device may be interacting with the merchant device when the second device is within a short range wireless signaling proximity range of the merchant device and/or when the second device exchanges/processes data with the merchant device. In this regard, the second device may perform electronic transaction processing or other data exchange/processing with the merchant device for a separate transaction between the second user/device and the merchant/merchant device. This transaction may be separate from the transaction between the first user/device and the merchant/merchant device, and require separate data; however, processing of this transaction electronically may utilize a communication channel between the second device and the merchant device, where the token for the first user/device may be transmitted to the merchant device over this channel. The second device may also transmit the token to the merchant device using another output component, such as a display screen and/or wired connection. In this regard, the token may be encoded into displayable data, such as a barcode or QR code, that may be displayed and scanned by the merchant device.

In various embodiments, the first token from the first device may be packaged with data transmitted to the merchant device that originates from the second device, such as a second token for electronic transaction processing of the separate transaction between the second user/device and the merchant/merchant device. In this regard, the first and second tokens may be combined as a single data package for transmission to the merchant device, or the first token may be combined with other data for the second device, including identifiers, handshake data, processed payments, etc. In various embodiments, the first token may be processed to combine a payment by the first user to the merchant/merchant device, which may be a pre-payment usable by the first user when processing a transaction with the merchant/merchant device. Processing of the first token to combine a payment with another payment in the second token may be done by an application executing on the second device, and utilize the aforementioned service provider/transaction processor. Such processing may occur in the background operations of the second device, such as a background executing process that is hidden for viewing/interaction by the second user. Additionally, the process may be protected from use and/or manipulation by the second user to preserve the integrity of the data in the first token for the first user and/or prevent misuse of the first token by the second user. Thus, a secure hardware/software element of the second device may perform the processing and/or transmission of the first token to the merchant device, and/or the processing of the first token to combine the first token or a payment by the first user with data transmitted by the second device to the merchant device. If processed, the payment may include an identifier or other identification information of the first user (e.g., a name, driver's license number, image, or other identifiable information that can be presented by the first user) so that the first user can utilize the pre-payment with the merchant device. The payment may also include a randomly generated number or a personal identification number (PIN) that may be supplied to the first user on use of the token at the merchant location to redeem the value of the token and/or use the token.

Once the first token and/or other data from the second device is transmitted to the merchant device by the second device, the first token may identify the first user and/or the token device to the merchant device for use of the first token and/or pre-payment for a transaction. The first user providing the first token may then use the first token and/or an amount pre-processed and pre-paid by the first token during transaction processing at the merchant location. The first user may be required to provide the appropriate identification/information for use of the token. As previously discussed, the token may be provided, and processed on supplying the appropriate information to the merchant device. In further embodiments, a pre-processing/payment using the token may be performed, which may be utilized based on supplying the information. If the value pre-processed or paid is not utilized, the value may be credited back to the user and/or the value may expire after a period of time of non-use. Thus, the token may be provided and/or processed by the second device/merchant device prior to the first user requiring use of the token so that processing time may be decreased when users, such as the first user, arrives at a merchant device and is ready to process a transaction electronically. Moreover, digital token use and electronic transaction processing may be provided to users and/or devices in offline environments where previous electronic transaction processing would be impossible. This allows users to increase use and prevalence of electronic transaction processing use, as well as decrease processing times between devices and making electronic transaction processing more convenient and faster to users.

FIG. 1 is a block diagram of a networked system 100 suitable for implementing the processes described herein, according to an embodiment. As shown, system 100 may comprise or implement a plurality of devices, servers, and/or software components that operate to perform various methodologies in accordance with the described embodiments. Exemplary devices and servers may include device, stand-alone, and enterprise-class servers, operating an OS such as a MICROSOFT® OS, a UNIX® OS, a LINUX® OS, or other suitable device and/or server based OS. It can be appreciated that the devices and/or servers illustrated in FIG. 1 may be deployed in other ways and that the operations performed and/or the services provided by such devices and/or servers may be combined or separated for a given embodiment and may be performed by a greater number or fewer number of devices and/or servers. One or more devices and/or servers may be operated and/or maintained by the same or different entities.

System 100 includes a first communication device 110, a second communication device 130, a merchant device 140, and a transaction processor server 150 in communication over a network 160. A first user (not shown) may utilize first communication device 110 to utilize the various features available for first communication device 110, which may include processes and/or applications associated with transaction processor server 150 to process a transaction (e.g., a payment or transfer) with a merchant (not shown) associated with merchant device 140. In this regard, first communication device 110 may have communication limitations that prevent direct short range wireless communications with merchant device 140. In order to transmit a token to merchant device 140, first communication device 110 may interact with second communication device 130, for example, through token device 120 by transmitting the token to second merchant device 130. Second communication device 130 may then utilize a short range communication channel with merchant device 140 to transmit the token for first communication device 110 to merchant device 140. Merchant device 140 may then process a transaction using the token and transaction processor server 150.

First communication device 110, token device 120, second communication device 130, merchant device 140, and transaction processor server 150 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 160.

First communication device 110 may be implemented as a communication device that may utilize appropriate hardware and software configured for wired and/or wireless communication with second communication device 130, and/or transaction processor server 150. For example, in one embodiment, first communication device 110 may be implemented as a personal computer (PC), telephonic device, a smart phone, laptop/tablet computer, wristwatch with appropriate computer hardware resources, eyeglasses with appropriate computer hardware (e.g. GOOGLE GLASS®), other type of wearable computing device, implantable communication devices, and/or other types of computing devices capable of transmitting and/or receiving data, such as an IPAD® from APPLE®. Although only one communication device is shown, a plurality of communication devices may function similarly.

First communication device 110 of FIG. 1 contains a transaction processing application 112, other applications 114, a database 116, and a communication module 118. Transaction processing application 112 and other applications 114 may correspond to executable processes, procedures, and/or applications with associated hardware. In other embodiments, first communication device 110 may include additional or different modules having specialized hardware and/or software as required.

Transaction processing application 112 may correspond to one or more processes to execute software modules and associated devices of first communication device 110 to process transaction by a first user corresponding to first communication device 110 with one or more other users, which may include payments or transfers for a transaction to a merchant associated with merchant device 140. In this regard, transaction processing application 112 may correspond to specialized hardware and/or software that may prepare and transmit a token to second communication device 130 for processing of the transaction, where second communication device 130 may transmit the token to merchant device 140. For example, the first user may wish to process a transaction (e.g., a payment or transfer) with the merchant corresponding to merchant device 140. Thus, the first user may utilize first communication device 110 to perform some executable process or enter a processing request for execution by first communication device 110. The processing request may correspond to a request for first communication device 110 to utilize processing resources, including activation of first communication device 110, operating first communication device 110 and/or transaction processing application 112, or performing a process in transaction processing application 112. In other embodiments, first communication device 110 may instead receive a processing request, or determine the processing request without user input, for example, based on operating system conditions of first communication device 110 (e.g., low battery, disabling of a communication signaling protocol/component, etc.). The processing request may also be determined based on a location of first communication device 110, such a merchant location for merchant device 140.

Once the processing request is received, transaction processing application 112 may determine whether first communication device 110 can form a communication channel with merchant device 140, to transmit a token, or whether use of token device 120 and/or second communication device 130 is required to transmit the token to merchant device 140. Transaction processing application 112 may determine that token device 120/second communication device 130 may be required to transmit the token to merchant device 140 where communication limitations prevent transaction processing application 112 of first communication device 110 from transmitting the token to merchant device 140. For example, battery power may be limited and/or first communication device 110 may run out of power in the near future. Communication channels available at the merchant location for merchant device 140 may prevent first communication device 110 from communicating with merchant device 140 (e.g., if merchant device only accepts, NFC, Bluetooth, or some other communication protocol that is unavailable to first communication device 110). Thus, transaction processing application 112 may be unable to communicate with merchant device 140. Conversely, if transaction processing application 112 may communicate with merchant device 140, then transaction processing application 112 may communicate the token directly to merchant device 140 without the use of token device 120 and/or second communication device 130.

In this regard, transaction processing application 112 may provide transaction processing services, for example, through one or more processes that provide an interface to permit the first user to enter data, such as associated with payment instruments, for example, through an input device (e.g., touch screen with a graphical user interface, keypad/keyboard, mouse, etc.) and/or through a data capture device (e.g., scanner, camera, other optical device, etc.). Such information may be stored with transaction processor server 150 for use with an online digital wallet stored to an account for the first user with transaction processor server 150, which may be utilized for transaction processing with another entity, such as the second user associated with second communication device 130. In various embodiments, information for the account may also be stored to first communication device 110 for use in an offline environment. The account accessible through transaction processing application 112 may be used to initiate, receive, and/or process/complete transactions using services provided by transaction processor server 150. Once entered, the payment instruments may be communicated to transaction processor server 150 over network 160 by transaction processing application 112 for establishment and/or maintenance/update of the account and/or entry into the digital wallet for the first user. The first user of first communication device 110 may also enter discounts and/or benefits to transaction processing application 112 for storage to the digital wallet and use during transaction processing.

Transaction processing application 112 may utilize one or more user interfaces, such as graphical user interfaces presented using an output display device of first communication device 110, to enable the first user associated with first communication device 110 to perform transaction processing, as discussed herein. In various embodiments, transaction processing application 112 may correspond to a general browser application configured to retrieve, present, and communicate information over the Internet (e.g., utilize resources on the World Wide Web) or a private network. For example, transaction processing application 112 may provide a web browser, which may send and receive information over network 160, including retrieving website information (e.g., a website for transaction processor server 150), presenting the website information to the user, and/or communicating information to the website. However, in other embodiments, transaction processing application 112 may include a dedicated application of transaction processor server 150 or other entity (e.g., a merchant), which may be configured to assist in processing transactions. Transaction processing application 112 may receive a token used for transaction processing, which may be stored to first communication device 110, or may generate the token using the data entered for the digital wallet and/or interface of transaction processing application 112. Transaction processing application 112 may then utilize communication module 118 of first communication device 110 to transmit the token to token device 120 and/or second communication device 130 over a communication channel available to first communication device 110 and prior to any communication limitations that may prevent transmission of the token.

In various embodiments, first communication device 110 includes other applications 114 as may be desired in particular embodiments to provide features to first communication device 110. For example, other applications 114 may include security applications for implementing client-side security features, programmatic client applications for interfacing with appropriate application programming interfaces (APIs) over network 160, or other types of applications. Other applications 114 may also include email, texting, voice, and instant messaging applications that allow a user to send and receive emails, calls, texts, and other notifications through network 160. In various embodiments, other applications 114 may include financial applications, such as banking applications. Other applications 114 may also include other location detection applications, which may be used to determine a location for the user, such as a mapping, compass, and/or GPS application, which can include a specialized GPS receiver that obtains location information for first communication device 110 and processes the location information to determine a location of first communication device 110 and the user. Other applications may include social networking applications, media viewing, and/or merchant applications. Other applications 114 may include device interface applications and other display modules that may receive input from the user and/or output information to the user. For example, other applications 114 may contain software programs, executable by a processor, including a graphical user interface (GUI) configured to provide an interface to the user.

First communication device 110 may further include database 116 stored to a transitory and/or non-transitory memory of first communication device 110, which may store various applications and data and be utilized during execution of various modules of first communication device 110. Thus, database 116 may include, for example, identifiers such as operating system registry entries, cookies associated with transaction processing application 112 and/or other applications 114, identifiers associated with hardware of first communication device 110, or other appropriate identifiers, such as identifiers used for payment/user/device authentication or identification, including one or more data tokens which may be utilized for transaction processing by communicating the token to merchant device 140. In various embodiments, additional account information and/or digital wallet information may be stored to database 116 for use by first communication device 110. Database 116 may be accessed to transmit a stored token to token device 120 and/or second communication device 130 for communication to merchant device 140 during transaction processing.

First communication device 110 includes at least one communication module 118 adapted to communicate with token device 120, second communication device 130, and/or transaction processor server 150. In various embodiments, communication module 118 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices. Communication module 118 may communicate directly with nearby devices (e.g., second communication device 130) using short range communications, such as Bluetooth Low Energy, LTE Direct, WiFi, radio frequency, infrared, Bluetooth, and near field communications.

Token device 120 may correspond to a separate device from first communication device 110 that may store a digital data token, and provide the token to second communication device 130 for transaction processing. In this regard, token device 120 may receive the data token from first communication device 110 over a communication channel, which may correspond to a first communication channel using a short range wireless protocol different from a protocol used by merchant device 140 and/or prior to first communication device 110 having a connection or communication limitation preventing first communication device 110 from transmitting the token to merchant device 140. Token device 120 may include a memory, such as a non-transitory memory, to store the token. Token device 120 may include a transceiver used to communicate over a particular short range wireless communication protocol with second communication device 130, including a Bluetooth or Bluetooth Low Energy (BLE) beacon, LTE Direct transceiver, NFC or other RFID antenna, or other communication component. Token device 120 may directly communicate the token to second communication device 110, for example, by actively searching for second communication device 130 using an identifier for second communication device 110, which may be received with the token for communication to second communication device 110. Thus, token device 120 may include one or more processing components and software, which may query nearby devices to determine second communication device 130 and connect with second communication device 130 for transmission of the token. However, in other embodiments, token device 120 may be more passive, and may provide the token to second communication device 130 in response to a query by second communication device 130. In such embodiments, second communication device 130 may query nearby devices for tokens, as discussed herein. Token device 120 may respond to a query from second communication device 130 for the token, and may provide the token to second communication device 130. Token device 120 may also correspond to one or more tags or stickers with the aforementioned information, which may be activated by first communication device 110 based on communication limitations of first communication device 110 and used to provide the token to second communication device 130.

Second communication device 130 may be implemented as a communication device that may utilize appropriate hardware and software configured for wired and/or wireless communication with first communication device 110, token device 120, merchant device 140, and/or transaction processor server 150. For example, in one embodiment, second communication device 130 may be implemented as a personal computer (PC), telephonic device, a smart phone, laptop/tablet computer, wristwatch with appropriate computer hardware resources, eyeglasses with appropriate computer hardware (e.g. GOOGLE GLASS®), other type of wearable computing device, implantable communication devices, and/or other types of computing devices capable of transmitting and/or receiving data, such as an IPAD® from APPLE®. Although only one communication device is shown, a plurality of communication devices may function similarly.

Second communication device 130 of FIG. 1 contains a transaction processing application 132, other applications 134, a database 136, and a communication module 138. Transaction processing application 132 and other applications 134 may correspond to executable processes, procedures, and/or applications with associated hardware. In other embodiments, second communication device 130 may include additional or different modules having specialized hardware and/or software as required.

Transaction processing application 132 may correspond to one or more processes to execute software modules and associated devices of second communication device 130 to process transaction by a second user corresponding to second communication device 130 with one or more other users, which may include payments or transfers to the merchant associated with merchant device 140. In this regard, transaction processing application 132 may correspond to specialized hardware and/or software that may receive a transaction request and process the transaction with merchant device 140, as well as transmit the token received from first communication device 110 to merchant device 140 while performing the transaction processing. As discussed herein, a first user associated with first communication device 110 may wish to process a transaction (e.g., a payment or transfer) with the merchant, but may be unable to process the transaction electronically using first communication device 110 with merchant device 140. Thus, the first user may utilize first communication device 110 to transmit a token used for electronic transaction processing to second communication device 130, which may include transmission through token device 120. Transaction processing application 132 may then store the token, which may be provided to merchant device 140 when second communication device 130 connects to merchant device 140 over a communication channel. In various embodiments, transaction processing application 132 may receive the token and connect to merchant device 140 without input by the second user, and pass the token to merchant device 140 in a background operating process. Additionally, transaction processing application 132 may also provide the token in data used by transaction processing application 132 when processing a transaction with merchant device 140, for example, by packaging the token with another token during electronic transaction processing. Each token may identify the respective user/device, as well as a transaction/amount for processing such that a single payment may be provided which may correspond to an overpayment for an amount that is usable by the first user to later process a transaction.

Transaction processing application 132 may provide transaction processing services, for example, through one or more processes that provide an interface to permit the second user to enter input and other data for payment instruments, for example, through an input device (e.g., touch screen with a graphical user interface, keypad/keyboard, mouse, etc.) and/or through a data capture device (e.g., scanner, camera, other optical device, etc.). Such information may be stored with transaction processor server 150 for use with an online digital wallet stored to an account for the second user with transaction processor server 150, which may be utilized for transaction processing with another entity, such as the merchant. In various embodiments, information for the account may also be stored to second communication device 130 for use in an offline environment. The account accessible through transaction processing application 132 may be used to initiate, receive, and/or process/complete transactions using services provided by transaction processor server 150. Once entered, the payment instruments may be communicated to transaction processor server 150 over network 160 by transaction processing application 132 for establishment and/or maintenance/update of the account and/or entry into the digital wallet for the second user. The second user of second communication device 130 may also enter discounts and/or benefits to transaction processing application 132 for storage to the digital wallet and use during transaction processing.

Transaction processing application 132 may utilize one or more user interfaces, such as graphical user interfaces presented using an output display device of second communication device 130, to enable the second user associated with second communication device 130 to perform transaction processing and/or view the results of a processed transaction, as discussed herein. In various embodiments, transaction processing application 132 may correspond to a general browser application configured to retrieve, present, and communicate information over the Internet (e.g., utilize resources on the World Wide Web) or a private network. For example, transaction processing application 132 may provide a web browser, which may send and receive information over network 160, including retrieving website information (e.g., a website for transaction processor server 150), presenting the website information to the user, and/or communicating information to the website. However, in other embodiments, transaction processing application 132 may include a dedicated application of transaction processor server 150 or other entity (e.g., a merchant), which may be configured to assist in processing transactions. The interface(s) provided by transaction processing application 132 may be utilized to populate transaction information for a transaction request (e.g., a payment or transfer request). When performing transaction processing, transaction processing application 132 may then pass the token from first communication device 110/token device 120 to merchant device 140 during transaction processing.

In various embodiments, second communication device 130 includes other applications 134 as may be desired in particular embodiments to provide features to second communication device 130. For example, other applications 134 may include security applications for implementing client-side security features, programmatic client applications for interfacing with appropriate application programming interfaces (APIs) over network 160, or other types of applications. Other applications 134 may also include email, texting, voice and IM applications that allow a user to send and receive emails, calls, texts, and other notifications through network 160. In various embodiments, other applications 134 may include financial applications, such as banking applications. Other applications 134 may also include other location detection applications, which may be used to determine a location for the user, such as a mapping, compass, and/or GPS application, which can include a specialized GPS receiver that obtains location information for second communication device 130 and processes the location information to determine a location of second communication device 130 and the user. Other applications may include social networking applications, media viewing, and/or merchant applications. Other applications 134 may include device interface applications and other display modules that may receive input from the user and/or output information to the user. For example, other applications 134 may contain software programs, executable by a processor, including a graphical user interface (GUI) configured to provide an interface to the user.

Second communication device 130 may further include database 136 stored to a transitory and/or non-transitory memory of second communication device 130, which may store various applications and data and be utilized during execution of various modules of second communication device 130. Thus, database 136 may include, for example, identifiers such as operating system registry entries, cookies associated with transaction processing application 132 and/or other applications 134, identifiers associated with hardware of second communication device 130, or other appropriate identifiers, such as identifiers used for payment/user/device authentication or identification, which may include a data token for the digital wallet of the second user for use during electronic transaction processing. In various embodiments, additional account information and/or digital wallet information may be stored to database 136 for use by second communication device 130. Database 136 may also store the data token received from first communication device 110 or token device 120, which may be provided to merchant device 140 during electronic transaction processing.

Second communication device 130 includes at least one communication module 138 adapted to communicate with first communication device 110, token device 120, merchant device 140, and/or transaction processor server 150. In various embodiments, communication module 138 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices. Communication module 138 may communicate directly with nearby devices (e.g., second communication device 130) using short range communications, such as Bluetooth Low Energy, LTE Direct, WiFi, radio frequency, infrared, Bluetooth, and near field communications.

Merchant device 140 of FIG. 1 contains an electronic sales application 142, other applications 144, a database 146, and a communication module 148. Electronic sales application 142 and other applications 144 may correspond to processes, procedures, and/or applications executable by a hardware processor, for example, a software program. In other embodiments, merchant device 140 may include additional or different modules having specialized hardware and/or software as required.

Electronic sales application 142 may correspond to one or more processes to execute modules and associated specialized hardware of merchant device 140 that provide sales, checkout, and payment processes for a transaction to purchase one or more items for sale from the user, such as a merchant or seller, corresponding to merchant device 140. In this regard, electronic sales application 142 may correspond to specialized hardware and/or software of merchant device 140 to provide a convenient interface to permit a merchant to enter, view, and/or edit items and/or services for purchase by the user associated with communication device 110. For example, electronic sales application 142 may be implemented as an application having a user interface enabling the merchant to enter item information and request payment for a transaction on checkout/payment of one or more items/services. In certain embodiments, electronic sales application 142 may correspond more generally to a web browser configured to view information available over the Internet or access a website corresponding to the merchant and/or an online marketplace utilized by the merchant. Thus, the user of second communication device 130 may initiate a transaction using electronic sales application 142 by providing one or more items to purchase in a transaction with the merchant associated with merchant device 140, which may be entered to a transaction.

Once a payment amount is determined for a transaction for items to be purchased by the second user, electronic sales application 142 may request payment from the user for transaction processing. Payment may be provided through a token for the second user/second communication device 130. The payment may be provided in response to a communication channel being established between second communication device 130 and merchant device 140. The token may be communicated to merchant device 140, which may be used with the transaction and transaction information for processing. The token or other payment data from second communication device 130 may be provided with another token from first communication device 110, which may have previously been provided to second communication device 130 for transmission to merchant device 140. Both tokens may identify their respective user/device for transaction processing such that the token from first communication device 110 may identify the first user for later transaction processing. Transaction processor server 150 may process the transaction with the provided token, which may include pre-payments using the token for first communication device 110. Electronic sales application 142 may then receive the results of the transaction processing, and complete the transaction with the respective user, for example, by providing the user the items for the transaction or declining the transaction where the user is not authenticated or the transaction is not authorized (e.g., insufficient funds, rejection of the transaction based on risk analysis by service provider server 150). A transaction history may then be generated by electronic sales application 142.

Merchant device 140 includes other applications 144 as may be desired in particular embodiments to provide features to merchant device 140. For example, other applications 144 may include security applications for implementing client-side security features, programmatic client applications for interfacing with appropriate application programming interfaces (APIs) over network 160, or other types of applications. Other applications 144 may also include email, texting, voice and IM applications that allow a user to send and receive emails, calls, texts, and other notifications through network 160. In various embodiments, other applications 144 may include financial applications, such as banking, online payments, money transfer, or other applications associated with communication device 130. Other applications 144 may contain software programs, executable by a processor, including a graphical user interface (GUI) configured to provide an interface to the user.

Merchant device 140 may further include database 146 which may include, for example, identifiers such as operating system registry entries, cookies associated with electronic sales application 142 and/or other applications 144, identifiers associated with hardware of merchant device 140, or other appropriate identifiers, such as identifiers used for payment/user/device authentication or identification. Identifiers in database 146 may be used by a payment/credit provider, such as transaction processor server 150, to associate merchant device 140 with a particular account maintained by the payment/credit provider. Database 146 may further include transaction information and/or results, including received payment instruments and/or user/merchant information. Additionally, tokens provided by second communication device 130 may be stored to database 146, which may include identification information for each token for use during transaction processing. Database 146 may also store information of available communication channels and/or protocols for use with merchant device 140, which may be used to determine if merchant device 140 is required to request receipt of a token over a particular channel and thus first communication device 110 is required to use token device 120 and/or second communication device 130 to transmit the token to merchant device 140.

Merchant device 140 includes at least one communication module 148 adapted to communicate with first communication device 110, second communication device 130, and/or transaction processor server 150. In various embodiments, communication module 148 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices.

Transaction processor server 150 may be maintained, for example, by an online service provider, which may provide transaction processing and payment services. In this regard, transaction processor server 150 includes one or more processing applications which may be configured to interact with first communication device 110, second communication device 130, merchant device 140, and/or another device/server to facilitate token generate and transaction processing, as well as request first communication device 110 transmit a token to second communication device 130 based on available communications between devices and communication limitations at a location. In one example, transaction processor server 150 may be provided by PAYPAL®, Inc. of San Jose, Calif., USA. However, in other embodiments, transaction processor server 150 may be maintained by or include another type of service provider, which may provide connection services to a plurality of users.

Transaction processor server 150 of FIG. 1 includes a transactions application 152, other applications 154, a database 156, and a network interface component 158. Transactions application 152 and other applications 154 may correspond to executable processes, procedures, and/or applications with associated hardware. In other embodiments, transaction processor server 150 may include additional or different modules having specialized hardware and/or software as required.

Transactions application 152 may correspond to one or more processes to execute software modules and associated specialized hardware of transaction processor server 150 to provide transaction processing services to the first and second users, for example though an account and/or payment instruments of the users stored in a digital wallet of the account. In this regard, transactions application 152 may correspond to specialized hardware and/or software to establish one or more accounts, including digital wallets storing payment instruments. The services may allow for payments and/or transfers between the first user, the second user, and/or the merchant through a payment instrument, including a credit/debit card, banking account, payment account with transaction processor server 150, and/or other financial instrument. In order to establish an account for a user to send and receive payments, transactions application 152 may receive information requesting establishment of the payment account. The information may include user personal, business, and/or financial information. Additionally the information may include a login, account name, password, PIN, or other account creation information. The user may provide a name, address, social security number, or other personal or business information necessary to establish the account and/or effectuate payments through the account. Transactions application 152 may further allow the user to service and maintain the payment account, for example, by adding and removing payment instruments.

Transactions application 152 may be used to provide a payment for a transaction between the first user, the second user, and/or the merchant, for example, where the first user utilizes first communication device 110 to automatically populate contact information for the second user and transmit a processing request for the transaction. Thus, when the first user for first communication device 110 wishes to process a payment or transfer with a merchant, first communication device 110 may provide a stored token or other required information (e.g., an identifier) to second communication device 130, as discussed herein, for identification of the first user's account. Where the first user is paying the merchant, the second communication device 130 may provide the token to merchant device 140, which may return the token to transaction application 152 for processing. Merchant device 140 may provide the token for identification of a digital wallet and/or a payment instrument, and/or other information necessary to process the transaction. Merchant device 140 may also provide another token for the second user/second communication device 130 for a transaction between the second user and the merchant. Transactions application 152 may then process the transaction using the received transaction information and the respective token. Transactions application 152 may utilize data in the transaction information to debit an account of the appropriate user and provide the payment to an account of the merchant. Transactions application 152 may also be used to provide transaction histories for processed transactions.

In various embodiments, transaction processor server 150 includes other applications 154 as may be desired in particular embodiments to provide features to transaction processor server 150. For example, other applications 154 may include security applications for implementing server-side security features, programmatic client applications for interfacing with appropriate application programming interfaces (APIs) over network 160, or other types of applications. Other applications 154 may contain software programs, executable by a processor, including a graphical user interface (GUI), configured to provide an interface to the user when accessing transaction processor server 150, where the user or other users may interact with the GUI to more easily view and communicate information. In various embodiments, other applications 154 may include connection and/or communication applications, which may be utilized to communicate information to over network 160.

Additionally, transaction processor server 150 includes database 156. As previously discussed, the first and/or second users may establish one or more digital wallets and/or accounts with transaction processor server 150. Digital wallets and/or accounts in database 156 may include user information, such as name, address, birthdate, payment instruments/funding sources, additional user financial information, user preferences, and/or other desired user data. Users may link to their respective digital wallets and/or payment accounts through an account, user, and/or device identifier or a generated token. Thus, when an identifier or a token is transmitted to transaction processor server 150, e.g., from first communication device 110 and/or second communication device 130, one or more digital wallets and/or payment accounts belonging to the users may be found. Database 156 may also store information about device operations, available communication protocols with first communication device 110, second communication device 130, and/or merchant device 140, and/or other connection information that may limit communications between devices. Such information may be used to determine when first communication device 110 is required to use token device 120 and/or second communication device 130 for transmission of the token to merchant device 140.

In various embodiments, transaction processor server 150 includes at least one network interface component 158 adapted to communicate first communication device 110, second communication device 130, and/or merchant device 140 over network 160. In various embodiments, network interface component 158 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Network 160 may be implemented as a single network or a combination of multiple networks. For example, in various embodiments, network 160 may include the Internet or one or more intranets, landline networks, wireless networks, and/or other appropriate types of networks. Thus, network 160 may correspond to small scale communication networks, such as a private or local area network, or a larger scale network, such as a wide area network or the Internet, accessible by the various components of system 100.

Figure 2A:
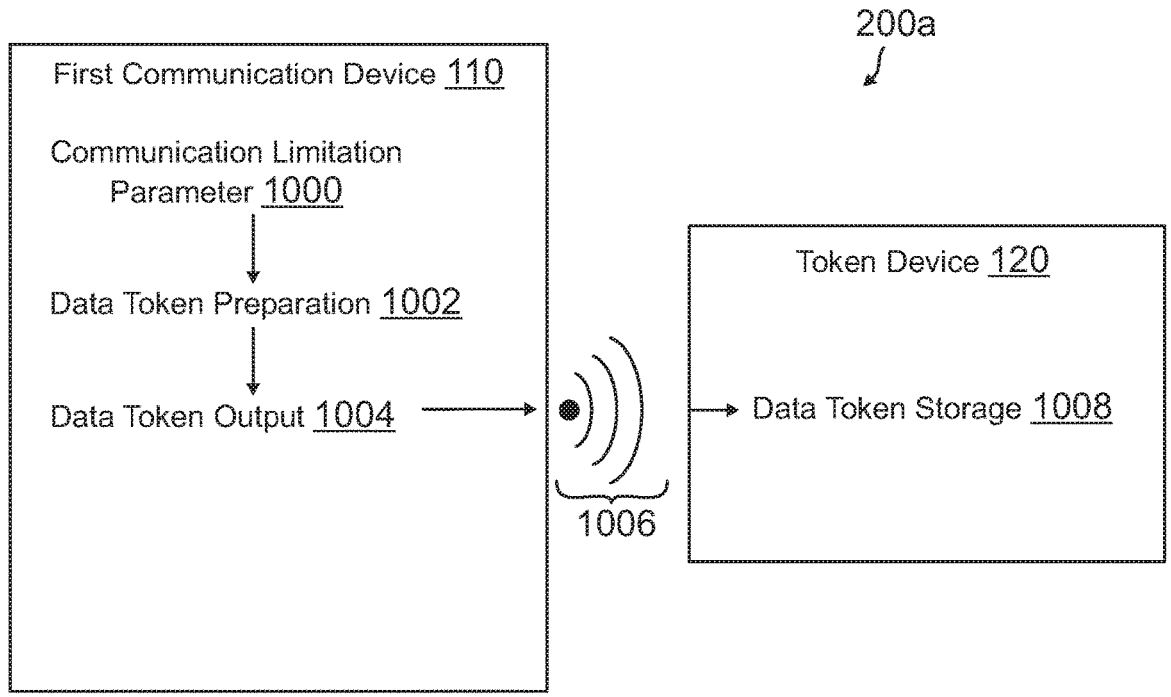
FIG. 2A is an exemplary system interaction between a communication device that may have communication limitations at a location and a token device for use at the location, according to an embodiment.

FIG. 2A is an exemplary system interaction between a communication device that may have communication limitations at a location and a token device for use at the location, according to an embodiment. Environment 200a of FIG. 2A includes a first communication device 110 and a token device 120 discussed in reference to system 100 of FIG. 1. In this regard, a first user utilizing first communication device 110 may wish to perform transaction processing with a merchant device, such as merchant device 140 from system 100. However, first communication device 110 may be unable to communicate with the merchant device, and may therefore utilize token device 120 for storage of a token used during electronic transaction processing.

In environment 200a, first communication device 110 may first detect or receive a communication limitation parameter, at step 1000, which may include a request to store a token for retrieval by a second communication device. In other embodiments, the communication limitation may also correspond to an operating system parameter, such as a battery status or available communication protocol, which may indicate that the token is required to be stored for retrieval by the other device. In response to the communication limitation parameter detected at step 1000, first communication device 110 may then perform data token preparation for the token, at step 1002, which may include generation of the data token and/or retrieval of the data token from a storage of first communication device 110, and preparation of the data token (e.g., encryption) for storage to token device 120 and later retrieval by the other device. Data token preparation may also include preparation of identification information for use of the data token, which may be used in electronic transaction processing to identify the first user for first communication device 110 when processing the transaction and/or allowing for purchase of an item by the user. Data token preparation may further include necessary information for transmission of the token to the other device, such as information stored with the token that indicates the token is for retrieval by the other device and/or an identifier for the other device for transmission of the token by token device 120 to the other device.

First communication device 110 may then process/perform data token output, at step 1004, which may include use of a first communication channel using a first short range wireless communication protocol, to transmit the token to token device 120. Short range wireless signals, at step 1006, may be used to store the token to token device 120. Token device 120 may receive the token from the wireless signals, at step 1006, using an antenna or other transceiver component. Token device 120 may then store the token in data token storage, at step 1008, where the token may be stored to a non-transitory memory component. The token may be stored with other data for use with transmitting the token to another device. Token device 120 may then provide the token to the other communication device over another, second, wireless communication channel, which may use the same or different short range wireless communication protocol. Moreover, the other device may then provide the token to a merchant device over a third communication channel. The third communication channel may utilize a different short range wireless communication protocol from the first communication channel, which may be unavailable to first communication device 110.

Figure 2B:
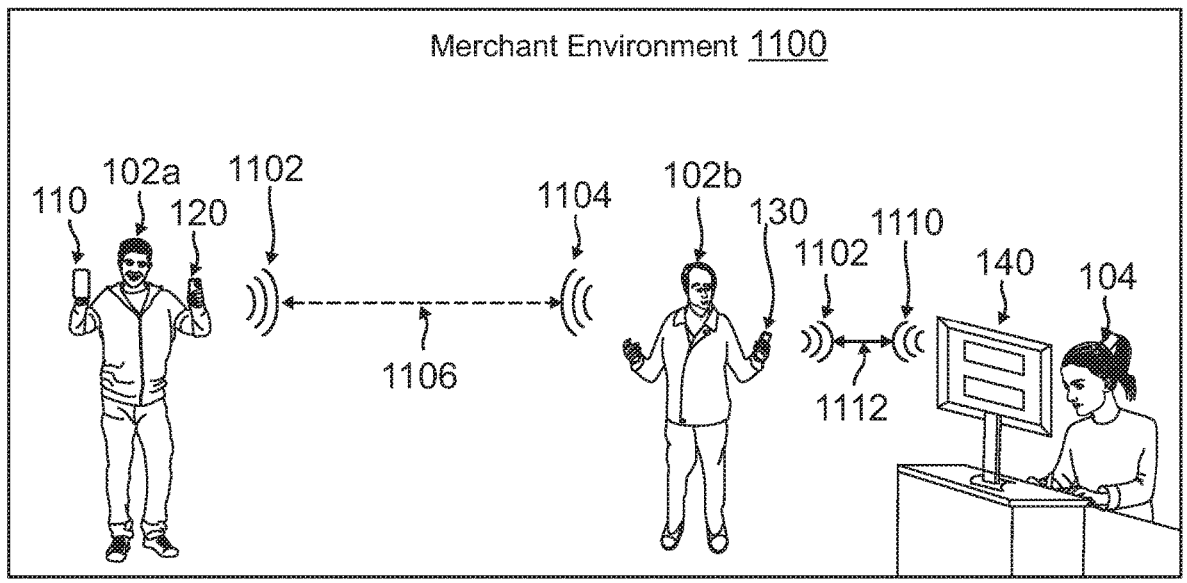
FIG. 2B is an exemplary environment showing a location where a first user may utilize a token device to store a token and transmit the token to a merchant device at the location using a communication device of a second user, according to an embodiment.

FIG. 2B is an exemplary environment showing a location where a first user may utilize a token device to store a token and transmit the token to a merchant device at the location using a communication device of a second user, according to an embodiment. FIG. 2A includes an environment 200b of a real-world merchant location 1100 having a first user 102a, a second user 102b, and a merchant 104. In this regard, first user 102a may utilize first communication device 110 corresponding generally to the described features, processes, and components of first communication device 110 in system 100 of FIG. 1. Additionally, second user 102b may utilize second communication device 130 corresponding generally to the described features, processes, and components of second communication device 130 in system 100 of FIG. 1.

For example, first user 102a and second user 102b are shown as located in the same real-world location of merchant location 1100. First user 102a may wish to perform transaction processing with merchant 104 electronically, using first communication device 110 to provide a token for transaction processing to merchant device 140. However, first communication device 110 may be unable to communication with merchant device 140 directly, for example, if first communication device 110 lacks power or a communication protocol to communicate with merchant device 140. Thus, first user 102a may be required to utilize a token device 120 in possession of first user 102a for storage of the token, where first communication device 110 may previously load the token to token device 120 for transmission to merchant device 140 through second communication device 130. Such loading may be in response to a detected operating condition and/or communication protocol, such as a battery level or status indicating that first communication device 110 may become non-operational or a communication protocol used at merchant environment 1100. In other embodiments, first communication device 110 may receive a request to store the token to token device 120, for example, in response to being located at merchant environment 1100.

Once the token is stored to token device 120, the token may be made available to second communication device 130 for transmission to merchant device 140. For example, token device 120 may output signals 1102 and second communication device 130 may output signals 1104 to form a first communication channel 1106 for the exchange of data. Over first communication channel 1106, token device 120 may provide the token to second communication device 130. Second communication device 130 may always scan for other tokens, for example, when performing transaction processing (e.g., in response to opening a transaction processing application or performing electronic transaction processing using the application). Second communication device 130 may also receive a request to scan for tokens, for example, from a service provider such as an online transaction processor. Second communication device 130 may then store the data token. Once stored to second communication device 130, second communication device 130 may then communicate the token to merchant device 140 over a separate communication channel using another communication protocol.

User 102b may utilize second communication device 130 to perform electronic transaction processing through an application executing on second communication device 130. During the electronic transaction processing, second communication device 130 may output signals 1108 to form a second communication channel 1112 using signals 1110 output by merchant device 140. Second communication device 130 may provide data used for electronic transaction processing over second communication channel 1112, which may utilize a different short range wireless communication protocol/components than first communication channel 1106. Merchant device 140 may then process the transaction with second user 102b using the data received over second communication channel 1112. Additionally, second communication device 130 may provide the token from token device 120 received over first communication protocol 1106 over second communication channel 1112 to merchant device 140. The token may identify first user 102a to merchant 104, so that when first user 102a arrives at merchant device 140 and requests to process a transaction with merchant 104, first user 102a may use the token from first communication device 110/token device 120 provided to merchant device 140 from second communication device 130. Merchant 104 may then process a transaction electronically using the token.

Figure 3:
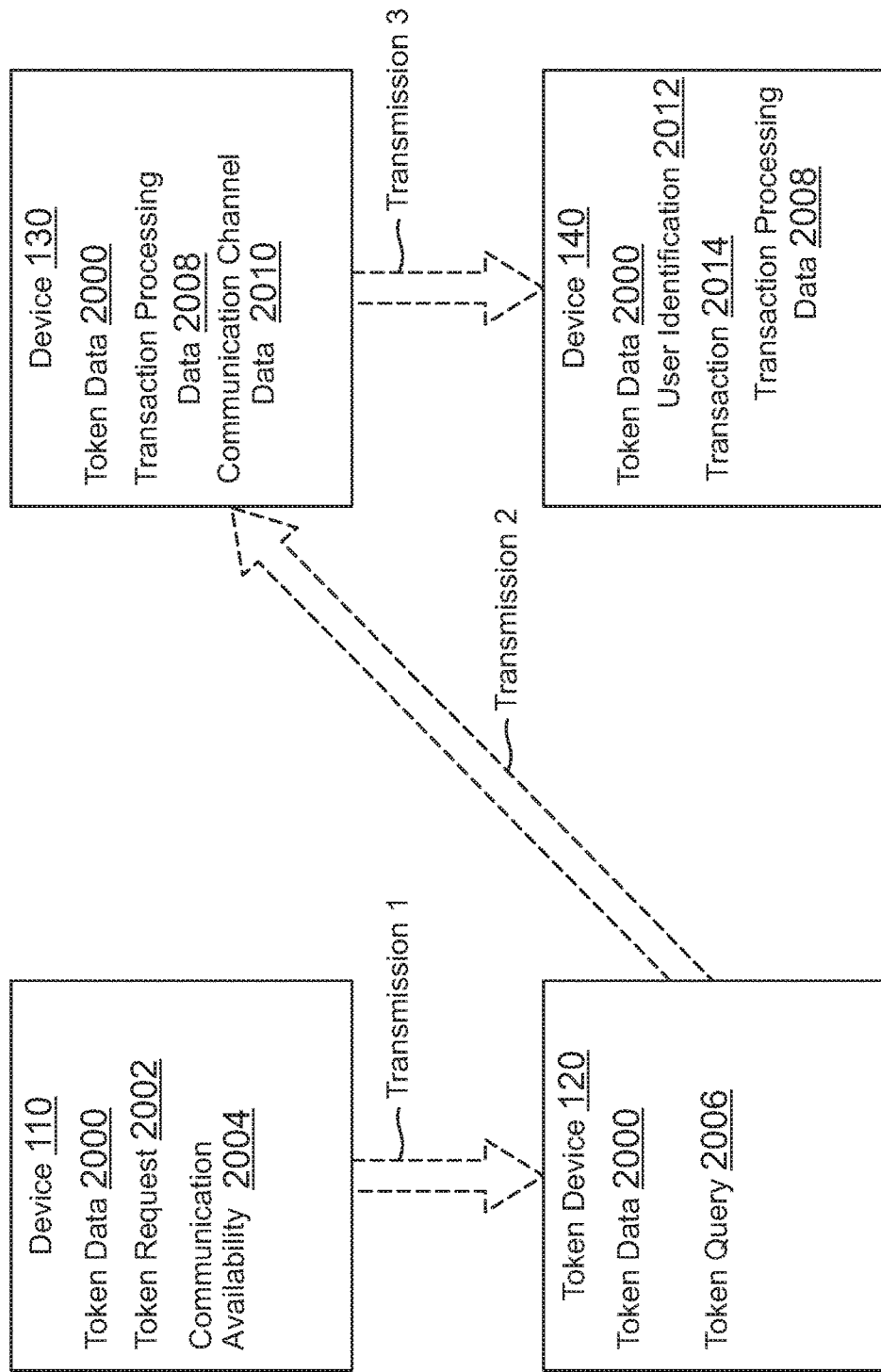
FIG. 3 is an exemplary system environment showing an active communication device transmitting a token to a merchant device at a location based on communications with a token device storing a data token, according to an embodiment.

FIG. 3 is an exemplary system environment showing an active communication device transmitting a token to a merchant device at a location based on communications with a token device storing a data token, according to an embodiment. Environment 300 of FIG. 3 includes a device 110, token device 120, a device 130, and a device 140 corresponding generally to first communication device 110, token device 120, second communication device 130, and merchant device 140, respectively, discussed in reference to system 100 of FIG. 1.

In environment 300, device 110 executes an application corresponding generally to the processes and features discussed in reference to transaction processing application 112 in system 100 of FIG. 1. In this regard, device 110 includes one or more tokens that may be prepared and transmitted to token device 120 based on communication limitations of device 110, such as power limitations, amounts, or levels, communication protocols available to device 110 and/or device 140, or other information on limits to direct short range communications between device 110 and device 140 so that device 110 and device 140 cannot form a communication channel for exchange of data. Device 110 therefore includes token data 2000, which may correspond to a data token for a digital wallet/payment instrument that allows for transaction processing electronically when using a tokenization system of a transaction processor service. Device 110 may include a token request 2002 that may be generated or received by device 110 based on the communication limitations for communications between device 110 and device 140 that prevent device 110 and device 140 from directly communicating for token exchange. Token request 2002 may be generated in response to data for communication availability 2004.

Token data 2000 may then be communicated to token device 120 over transmission 1, which may correspond to first short range wireless signals that store token data 2000 to token device 120 and/or activate token device 120 for use with device 130 to provide token data 2000 to device 130. Once token device 120 is active for exchange of token data 2000 with device 130, token device 120 may receive a token query 2006, which may correspond to second short range wireless signals using the same or a different short range wireless communication protocol from the first short range wireless signals. Token query 2006 may correspond to a request for token data 2000, which may be provided to device 130 over transmission 2. Transmission 2 may utilize another communication channel separate from device 110, where the communication channel may be formed between token device 120 and device 130.

Device 130 may then store token data 2000 for later transmission to device 140 and use during transaction processing. Device 130 may also be used to process a separate transaction with device 140, which may utilize another token or other data. Thus, device 130 may include transaction processing data 2008 for processing the separate transaction, such as a transaction 2014 currently processing on device 140. Device 130 may utilize communication channel data 2010 to perform transmission 3 with device 140 in order to provide token data 2000 and transaction processing data 2008 to device 140. Device 140 may then receive token data 2000, which may include a user identification 2012 to identify the user associated with device 110 during transaction processing so that the user may utilize token data 2000 for a payment for a transaction. Device 140 may further process transaction 2014 using transaction processing data 2008 received over transmission 3 from device 130.

Figure 4:
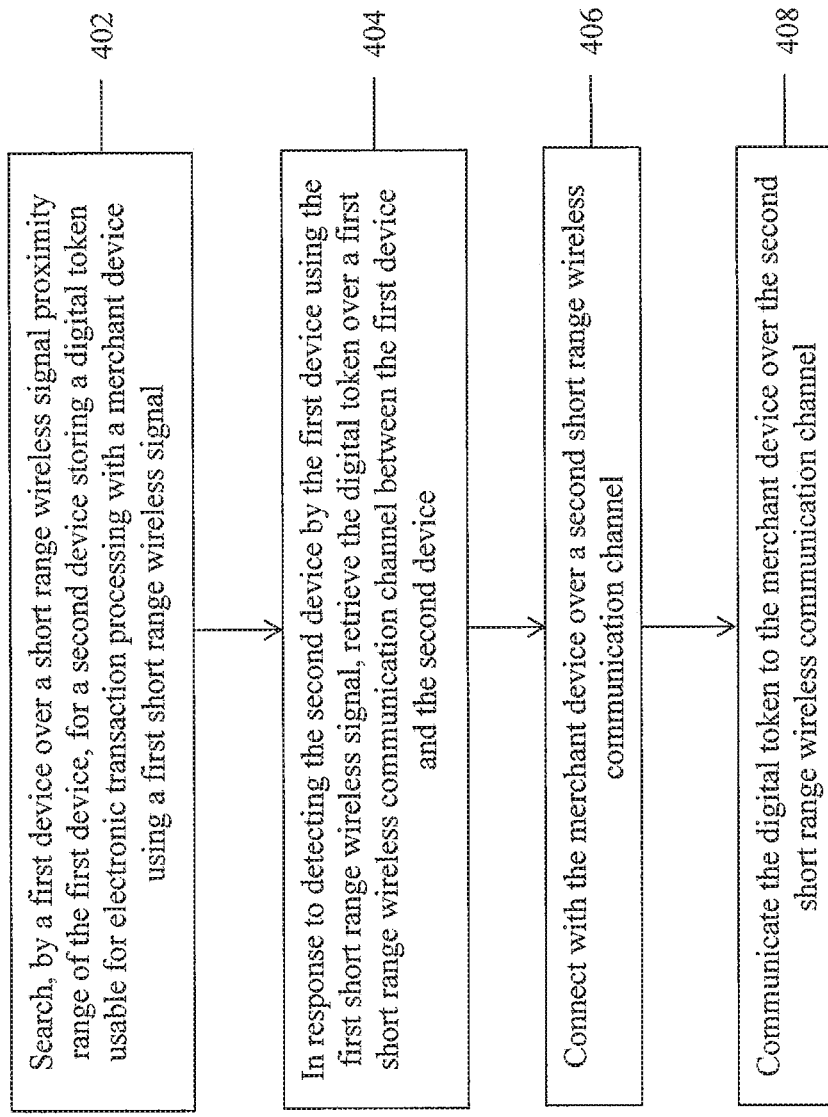
FIG. 4 is an exemplary process flowchart for local digital token transfer during device communication limitations, according to an embodiment.

FIG. 4 is an exemplary process flowchart for local digital token transfer during device communication limitations, according to an embodiment. Note that one or more steps, processes, and methods described herein may be omitted, performed in a different sequence, or combined as desired or appropriate. In one or more embodiments, all or some of operations of process 400 may be performed by a user computing device such as a smartphone, wearable computing device, etc. In other embodiments, all or some of operations of process 400 may be performed by another computing device.

At step 402, a first device searches over a short range wireless signal proximity range of the first device for a second device storing a digital token usable for electronic transaction processing with a merchant device using a first short range wireless signal. The first device may search over the short range wireless signal proximity range when processing an electronic transaction with the merchant device. The first device may search over the short range wireless signal proximity range without user input to the first device on one of initiating of electronic transaction processing with the merchant device or opening of an application for the electronic transaction processing. The second device providing the token may comprise one of an RFID tag, a keyfob device, a Bluetooth or Bluetooth Low Energy beacon device, or an NFC device, and the token may be stored to the second device by another communication device in response to determining that at least a portion of functionality of the other communication device in unusable at the location of the other communication device, for example, to connect with the merchant device. Thus, the first device may search over a plurality of devices at the location for the digital token, which may be done based on a token retrieval request that is generated in response to determining that the functionality of the other communication device is unusable at the location. It may be determined that the functionality of the second device is partially or entirely unusable at the location is based on at least one of a power level of the second device, past used communication channels used by the second device, or communication signals available at the location.

In response to detecting the second device by the first device using the first short range wireless signal, the digital token is retrieved over a first short range wireless communication channel between the first device and the second device, at step 404. At step 406, the first device connects with the merchant device over a second short range wireless communication channel. The merchant device requests use of a first short range wireless communication protocol in response to the merchant device detecting that the first device cannot connect to the merchant device, for example, if a second short range wireless communication protocol used by the first device is unavailable to the merchant device. This may be requested through an online service provider, where the online service provider searches for other devices including the second device at the merchant location, and wherein the token retrieval request is received by the second device from the online service provider. Thus, the first short range wireless communication channel is different and uses a different communication range than the second short range wireless communication channel.

The digital token is communicated to the merchant device over the second short range wireless communication channel, at step 408. In order to communicate the digital token to the merchant device, the first device may determine data for a transaction with the merchant device, where the digital token is communicated with the data to the merchant device. The digital token may be combined with a second token in the data for the transaction, where the second token may be used for electronic transaction processing between the first device and the second device. Such processing and/or combining may be performed by a background process of an application executing on the mobile device system without user input to the mobile device system. Thus, the first digital token may include an identifier or other identification information for a user associated with the second device. In other embodiments, the first token and the second token may provide a single payment to the merchant device during the transaction, wherein the single payment comprises an overpayment of transaction for the future payment, and wherein the single payment identifies the future payment for use by the user of the second device at the location for the merchant device.

Figure 5:
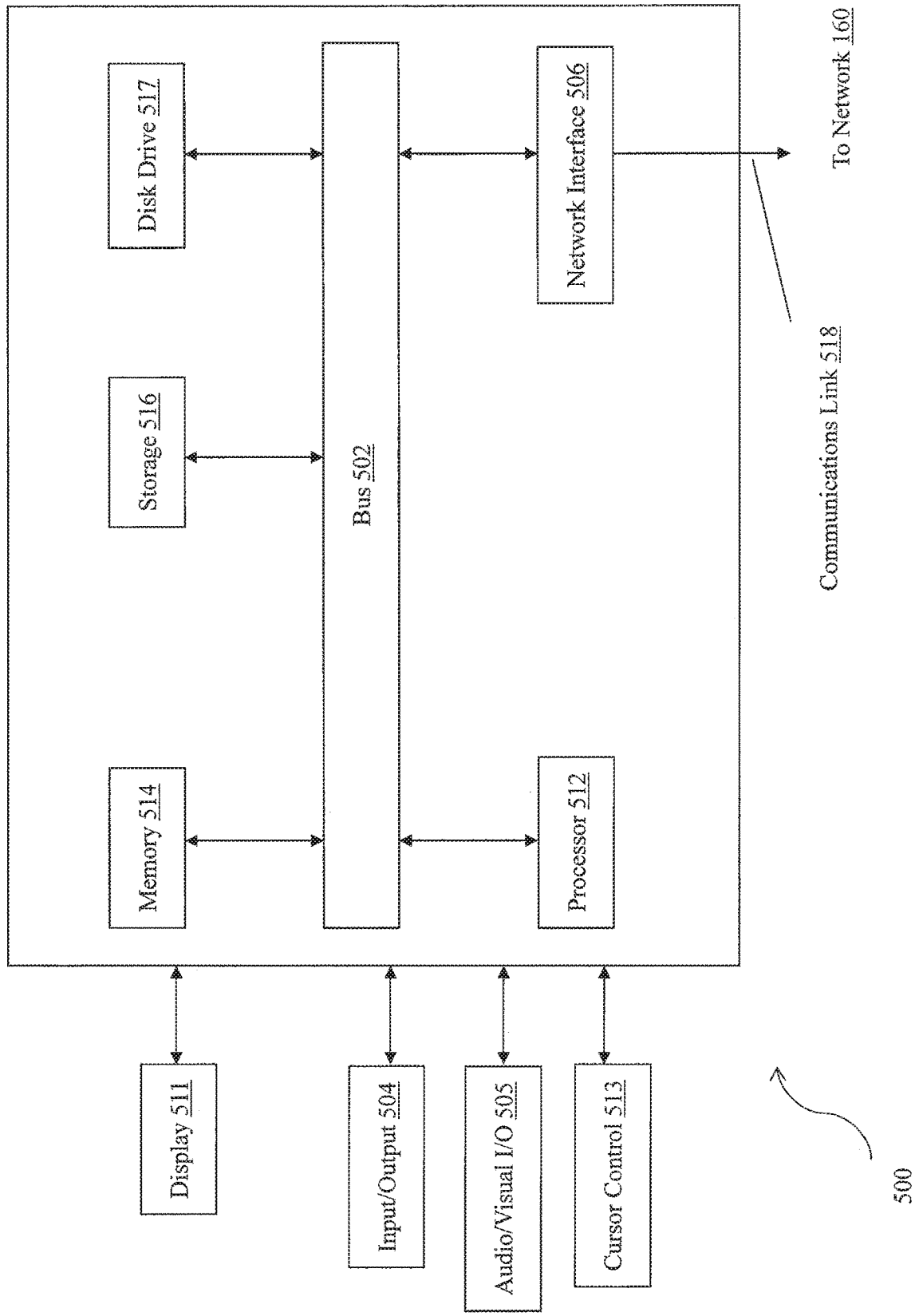
FIG. 5 is a block diagram of a computer system suitable for implementing one or more components in FIG. 1, according to an embodiment.

FIG. 5 is a block diagram of a computer system suitable for implementing one or more components in FIG. 1, according to an embodiment. In various embodiments, the communication device may comprise a personal computing device (e.g., smart phone, a computing tablet, a personal computer, laptop, a wearable computing device such as glasses or a watch, Bluetooth device, key FOB, badge, etc.) capable of communicating with the network. The service provider may utilize a network computing device (e.g., a network server) capable of communicating with the network. It should be appreciated that each of the devices utilized by users and service providers may be implemented as computer system 500 in a manner as follows.

Computer system 500 includes a bus 502 or other communication mechanism for communicating information data, signals, and information between various components of computer system 500. Components include an input/output (I/O) component 504 that processes a user action, such as selecting keys from a keypad/keyboard, selecting one or more buttons, image, or links, and/or moving one or more images, etc., and sends a corresponding signal to bus 502. I/O component 504 may also include an output component, such as a display 511 and a cursor control 513 (such as a keyboard, keypad, mouse, etc.). An optional audio input/output component 505 may also be included to allow a user to use voice for inputting information by converting audio signals. Audio I/O component 505 may allow the user to hear audio. A transceiver or network interface 506 transmits and receives signals between computer system 500 and other devices, such as another communication device, service device, or a service provider server via network 160. In one embodiment, the transmission is wireless, although other transmission mediums and methods may also be suitable. One or more processors 512, which can be a micro-controller, digital signal processor (DSP), or other processing component, processes these various signals, such as for display on computer system 500 or transmission to other devices via a communication link 518. Processor(s) 512 may also control transmission of information, such as cookies or IP addresses, to other devices.

Components of computer system 500 also include a system memory component 514 (e.g., RAM), a static storage component 516 (e.g., ROM), and/or a disk drive 517. Computer system 500 performs specific operations by processor(s) 512 and other components by executing one or more sequences of instructions contained in system memory component 514. Logic may be encoded in a computer readable medium, which may refer to any medium that participates in providing instructions to processor(s) 512 for execution. Such a medium may take many forms, including but not limited to, non-volatile media, volatile media, and transmission media. In various embodiments, non-volatile media includes optical or magnetic disks, volatile media includes dynamic memory, such as system memory component 514, and transmission media includes coaxial cables, copper wire, and fiber optics, including wires that comprise bus 502. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 500. In various other embodiments of the present disclosure, a plurality of computer systems 500 coupled by communication link 518 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A mobile device system comprising:
a non-transitory memory; and
one or more hardware processors coupled to the non-transitory memory and configured to read instructions from the non-transitory memory to cause the mobile device system to perform operations comprising:
receiving, from a service provider server, a token retrieval request for a first token stored on a token device at a location, wherein the token retrieval request comprises an indication that another mobile device system is unable to communicate with a merchant device at the location, and wherein the token retrieval request comprises an identifier for the token device which is associated with the another mobile device system;
determining the token is at the location using the identifier and a first short range wireless communication channel communicating with the token device;
retrieving the first token from the token device over the first short range wireless communication channel;
connecting with the merchant device at the location over a second short range wireless communication channel; and
transmitting the first token to the merchant device over the second short range wireless communication channel.

2. The mobile device system of claim 1, wherein the first short range wireless communication channel is different and uses a different communication range than the second short range wireless communication channel.

3. The mobile device system of claim 1, wherein the token first device comprises one of an RFID tag, a keyfob device, a Bluetooth or Bluetooth Low Energy beacon device, or an NFC device.

4. The mobile device system of claim 1, wherein the location includes a plurality of devices at the location, including the token device, and wherein the operations further comprise:
searching, by the mobile device system, the plurality of devices for the first token stored to on the token device.

5. The mobile device system of claim 1, wherein the operations further comprise:
determining that the another mobile device system is unusable at the location for conducting a transaction with the merchant device based on the indication.

6. The mobile device system of claim 5, wherein the indication comprises one of power level of the another mobile device system, a past used communication channel used by the another mobile device system, or communication signals available at the location.

7. The mobile device system of claim 1, wherein the operations further comprise:
in response to a transaction processing request with the merchant device, determining a transaction with the merchant device, wherein connecting with the merchant device is performed based on the transaction processing request; and
determining data for processing the transaction,
wherein the data is communicated with the first token.

8. The mobile device system of claim 7, wherein the data comprises a second token, and wherein the operations further comprise:
combining the first token with the second token for transmission to the merchant device.

9. The mobile device system of claim 8, wherein the combining is performed by a background process of an application executing on the mobile device system without user input to the mobile device system.

10. The mobile device system of claim 8, wherein the first token identifies a first user associated with the token first device for a future payment to the merchant device.

11. The mobile device system of claim 10, wherein the combining the first token with the second token provides a single payment to the merchant device during the transaction, wherein the single payment comprises an overpayment of the transaction for the future payment, and wherein the single payment identifies the future payment for a use by the first user at the location.

12. The mobile device system of claim 1, wherein the token retrieval request further comprises a request from a service provider that the mobile device system searches the location for the first token.

13. The mobile device system of claim 12, wherein the request identifies a plurality of token devices at a plurality of locations for the first token.

14. A non-transitory machine-readable medium having stored thereon machine-readable instructions executable to cause a machine to perform operations comprising:
receiving, by a first device from a service provider, an indication that a second device is unable to conduct a transaction with a merchant device, wherein the indication comprises an identifier for a token device associated with the second device;
searching, by the first device over a short range wireless signal proximity range of the first device, for the token device storing a digital token usable for electronic transaction processing with the merchant device using the identifier and a first short range wireless signal in response to the indication;
in response to detecting the token device by the first device using the identifier and the first short range wireless signal, retrieving the digital token from the token second device over a first short range wireless communication channel between the first device and the token device;
connecting with the merchant device over a second short range wireless communication channel; and
communicating the digital token to the merchant device over the second short range wireless communication channel.

15. The non-transitory machine-readable medium of claim 14, wherein the first device searches over the short range wireless signal proximity range when processing an electronic transaction with the merchant device.

16. The non-transitory machine-readable medium of claim 15, wherein the searching, by the first device over the short range wireless signal proximity range, occurs without user input to the first device in response to one of initiating of electronic transaction processing with the merchant device or opening of an application for the electronic transaction processing.

17. A method comprising:
in response to a merchant device requesting use of a first short range wireless communication protocol by devices at a merchant location associated with the merchant device, receiving, by a first device, a token retrieval request for a payment token stored to on a token device at the merchant location, wherein the token retrieval request comprises an indication that a second device associated with the token device is unable to communicate with the merchant device, and wherein the token retrieval request comprises an identifier for the token device associated with the second device;
requesting, by the first device, the payment token from the token device using the identifier and a second short range wireless communication protocol different from the first short range wireless communication protocol available to the token device;
receiving, by the first device, the payment token from the token device over a communication channel using the second short range wireless communication protocol; and
communicating, by the first device, the payment token to the merchant device using the first short range wireless communication protocol requested by the merchant device.

18. The method of claim 17, wherein the second short range wireless communication protocol is not available for use by the merchant device.

19. The method of claim 17, wherein the token retrieval request is received by the first device from an online service provider.

20. The method of claim 17, wherein the first device, the token device, and the merchant device are located at the merchant location, and wherein the first device is able to use the first short range wireless communication protocol and the second short range wireless communication protocol at the merchant location.

* * * * *

UNITED STATES PATENT AND TRADEMARK OFFICE
CERTIFICATE OF CORRECTION

PATENT NO. : 10,679,208 B2
APPLICATION NO. : 15/818362
DATED : June 9, 2020
INVENTOR(S) : Michael Charles Todasco and Cheng Tian Page 1 of 1

It is certified that error appears in the above-identified patent and that said Letters Patent is hereby corrected as shown below:

In the Claims

Column 27, Claim 1, Line 28, change "determining the token is" to --determining the token device is--

Column 27, Claim 6, Line 60, change "comprises one of power" to --comprises one of a power--

Column 28, Claim 11, Line 18, change "claim 10, wherein the" to --claim 10, wherein--

Column 28, Claim 14, Line 49, change "token second device" to --token device--

Column 29, Claim 17, Line 6, change "token stored to on" to --token stored on--

Signed and Sealed this
Sixteenth Day of February, 2021

Drew Hirshfeld
*Performing the Functions and Duties of the*
*Under Secretary of Commerce for Intellectual Property and*
*Director of the United States Patent and Trademark Office*